United States Patent [19]

Oka

[11] Patent Number: 4,840,020
[45] Date of Patent: Jun. 20, 1989

[54] MOWER HEIGHT ADJUSTMENT MECHANISM

[75] Inventor: Ken K. Oka, St. Catharines, Canada

[73] Assignee: Deere & Company, Moline, Ill.

[21] Appl. No.: 208,697

[22] Filed: Jun. 20, 1988

[51] Int. Cl.$^4$ ............................................. A01D 34/74
[52] U.S. Cl. ..................................... 56/15.2; 56/17.2; 56/6; 172/395
[58] Field of Search ....................... 56/6, 7, 17.2, 17.1, 56/15.2, 208; 172/395, 429

[56] References Cited

U.S. PATENT DOCUMENTS 3,053,033 9/1962 Maguire ................................. 56/25.4

FOREIGN PATENT DOCUMENTS 2339196 2/1975 Fed. Rep. of Germany ...... 172/395

OTHER PUBLICATIONS

Befco Finishing Mower, 4 pages.
John Deere Model 506–606 Integral Rotary Cutter, see particularly p. 6 of "Rotary Cutters and Shreaders" literature by Deere & Company, 19 pages, Issue A-1-3-84-12; see also photocopied single page designated SM6275, also published by Deere & Company.
John Deere 503 Rotary Cutter, single page, published by Deere & Company.
New Holland Rotary Motors, 6 pages, published by New Holland, Form No. 9337-6-66W.
Bush Hog Squealer Rotary Cutters, 4 pages, published by Bush Hog, Allied Products Corporation, Issue BH-4.
Caldwell Challenger 7, 2 pages, published by E. L. Caldwell & Sons, Inc., Form No. 120-2120.
Big Ox Rotary Cutters, 2 pages, published by Big Ox, Southeast Manufacturing Co., Inc.
Woods Rotary Motor RM42 Series, 2 pages, published by Woods, Division on Hesston Corporation, Form F-6164.
Bush Hog TM Series Rotary Cutters, 8 pages, published by Bush Hog, Allied Products Corporation, Form BH-15.

Primary Examiner—John Weiss

[57] ABSTRACT

There is disclosed a rotary mower which is comprised of a top deck and sidewalls, a connecting structure for supporting the front of the mower on a tracking three-point hitch, a drive shaft connectable to a tractor power take-off, a gearbox and rotor to drive the mower blade and a tail wheel for varying blade cutting height adjustably supported by a support tube pivotally carried by the mower deck. The tail wheel adjustment structure is carried between the mower deck and wheel support tube to reduce stresses and resulting deformation on the deck and sidewalls and is compactly designed to minimize projection of parts above the tail wheel support tube both during operation and shipment.

4 Claims, 1 Drawing Sheet

MOWER HEIGHT ADJUSTMENT MECHANISM

BACKGROUND OF THE INVENTION

1. Field of the Invention.

The present invention relates to improvements in rotary cutters used for such applications as mowing grass and weeds, and shredding crop stalks, small brush and saplings.

2. Description of the Related Art.

Rotary mowers or cutters typically include a blade mounted for rotation about a vertical axis and carried within a housing that is towed behind a mobile vehicle, such as a tractor. The housing includes a deck above the blade and skirts projecting downwardly from the deck to contain the cut material within the housing. The housing further includes hitch structure at its forward end to connect the mower with the tractor and a ground engaging wheel to carry the rear section of the mower.

Mower tail wheels are mounted in a variety of fashions. Commonly the tail wheels are mounted on an arm or a tail wheel tube that extends rearwardly beyond the rear of the mower deck and is pivotally mounted to the housing deck to swing up and down. To raise and lower the deck, and accordingly the cutting blade to the desired cutting height above the ground, various bracket and attaching means are used to adjustably position the tail wheel tube and wheel relative to the deck.

Many present mower height adjustment structures provide brackets on the rear skirting of the mower housing and a compatible bracket mounted to the tail wheel tube. One example of this manner of providing for mower height adjustment is found on the John Deere Model 506 Rotary Cutter.

While these type of height adjustment mechanisms function adequately, stresses can be encountered in the deck frame and particularly the rear skirt that cause twisting deformation of the skirt and upper deck.

SUMMARY OF THE INVENTION

Accordingly, it is an object of the present invention to provide a mower cutting height adjusting structure between the mower tail wheel support tube and deck which will reduce the stresses transferred to the mower deck and skirt areas and improve durability of the connecting structure.

Specifically, it is an object to provide a height adjusting structure which provides for forces transferred to the deck from the wheel supporting tube to be transferred to the top of the deck at a location laterally of the mower deck frame member. By connecting the adjustment structure to the deck at its upper surface rather than on the rear skirt, the distance between the attaching structure and the reinforcing deck frame member is reduced, thereby reducing the resulting moment arm that contributes to twisting forces being imparted to the rear deck skirt. Through locating the adjustment structure on the deck, essentially at the terminal point of the deck frame member rather than rearwardly of it, again the moment arm about which twisting forces are imparted to the deck's surface is reduced to reduce stresses transferred to the top deck.

It is further an object to provide an adjustment structure, in combination with the tail wheel tube, which does not detrimentally project above the tail wheel tube as the height of the mower is adjusted. With this design, the mower can more easily be stacked for shipment, shipment damages can be minimized and delays or damages caused by the adjustment structure projections catching on low hanging branches or other obstacles during mowing operations are minimized.

It is further an object to provide an adjustment structure that is simple to operate, inexpensive to manufacture and install, does not require close tolerances or telescoping parts and minimizes welding requirements.

BRIEF DESCRIPTION OF THE DRAWINGS

Other objects, aspects and advantages of the prevent invention will become more apparent from the following detailed description taken in conjunction with the accompanying drawings, in which.

DETAILED DESCRIPTION OF THE INVENTION

Figure 1:
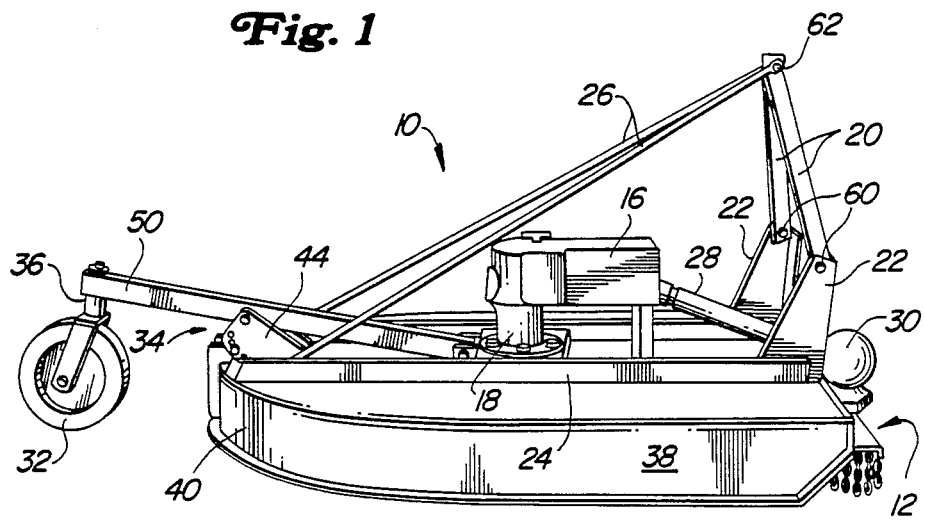
FIG. 1 is a pictorial representation of a rotary cutter or mower according to the present invention.

Referring now to the drawings and initially to FIG. 1, there is shown a rotary cutter or mower 10 which includes a housing 12. On the top surface or deck 14 of the housing 12 is mounted a gear box 16 and rotor 18 for driving a shaft and rotary cutting blade carried beneath the housing 12. Carried at the front end cf the housing 12 is structure for integrally mounting the cutter to a tractor. This structure includes upper mast links 20 and lower mast links 22. Connected to the upper mast links 20 and extending rearwardly to the spaced apart mower deck reinforcing member 24 are stabilizing rods or braces 26. These braces 26 serve to support, in part, the weight of the rear section of the mower 10 during operation. To drive the gear box 16 and blade is the power train or drive shaft 28. The shaft 28 includes a shield 30 to protect its connection with the PTO of a tractor.

Carried at the rear portion of the mower 12 is the tail wheel 32 which serves to support the rear portion of the mower or cutter 12 during operation and also serves through a height adjustment structure 34 to vary the height of the deck 14 above the ground and therefore the blade's cutting height.

The tail wheel 32 is supported to caster about a slightly rearwardly inclined support pin 36 to allow it to follow ground contour and track the tractor as necessary during operation.

Connected to upper deck 14 of the mower housing 12 are depending side skirt portions 38 which extend into a rear skirted portion 40. The upper deck 14 carries a pair of laterally spaced fore-and-aft extending reinforcing members or beams 24 to provide stability to the deck structure.

Figure 2:
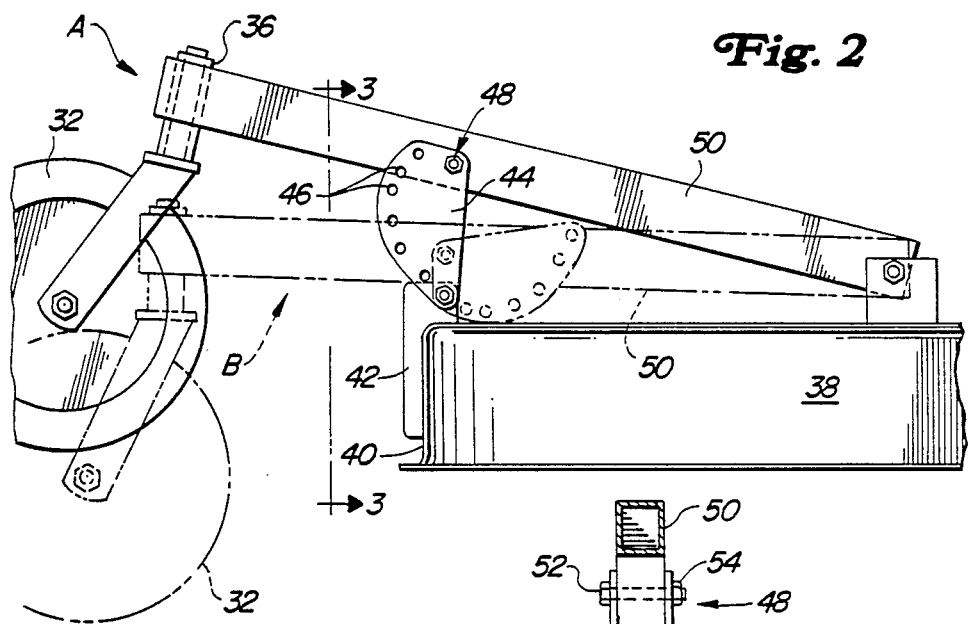
FIG. 2 is a side elevational view of the rear portion of the mower illustrating the adjustment structure at one end of its range of adjustment in solid lines and at the other end of its range of adjustment in phantom lines.
Figure 3:
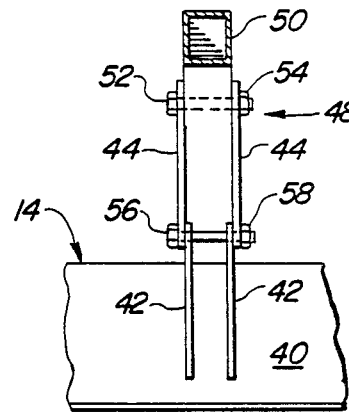
FIG. 3 is a rear elevational view of the adjustment structure taken along line 3—3 of FIG. 2.

Looking now to FIG. 2 and the preferred embodiment of the invention, there is illustrated the height adjustment structure components. The adjusting structure is comprised of a deck bracket 42 mounted to the upper portion of the housing or deck 14 and carried only in minor part on the rear skirt 40. It further includes a pair of right and left cam-shaped adjustment members 44, each with a plurality of adjustment holes 46 or settings. The bracket or bolt mounting 48 for securing the cam-shaped adjustment members 44 to the tail wheel tube 50 includes the opening through the tail wheel tube 50 wherein a bolt 52 is placed and secured by a nut 54. Similar bolt-nut securing means 56-58 is provided for connecting the two cam-shaped members 44 in the appropriate setting to the lower deck bracket mounting 42.

The tail wheel 32 is mounted to swivel or caster 360° as it follows the ground contour and tracks the tractor around corners or turns. Accordingly, it is carried sufficiently rearwardly of the mower to permit it to rotate through the full 360° without contacting the rear portion of the mower housing 12.

The range of adjustment of the cam-shaped members 44 is illustrated by the two positions of the tail wheel tube 50 illustrated in FIG. 2, designated A and B. The cam-shaped adjustment members, when adjusted to the full lowered position protrude or extend very little above the tail wheel tube 50. In the raised position illustrated by the solid lines of FIG. 2 and designated A, no protrusion of the cam-shaped adjusting members 44 above the tube 50 exists.

In operation, the rotary cutter 10 is integrally mounted to a tractor by connecting the lower hitch pins 60 to the lower hitch links of the tractor and the upper hitch pin 62 to the upper hitch link of the tractor. The integral mounting provides not only for the tractor to carry the forward portion of the mower 12 during operation, but for the mower 12 to be carried in an elevated position if desired during transport. The stabilizing bars 26 transfer some of the rear section's weight to the tractor, but the greater portion of the weight of the rear of the mower 12 is carried on the tail wheel 32.

After the integral mounting is connected, the power train or drive shaft 28 is connected to the tractor PTO to power the gear box 16 and blade.

Next, the operator would adjust the height of the mower housing 12 and accordingly the blade above the ground. To do this, he simply elevates the mower 12 on the tractor 3-point hitch, then removes the bolt 56 connecting the cam-shaped members 44 with the lower bracket 42. He then raises the wheel 32 by lifting the tail wheel tube 50 and re-inserts the bolt 56 through the appropriate hole 46 in the cam-shaped adjustment member 44 and the lower bracket 42 and attaching the nut 56 to the bolt 58. The mower 12 is then lowered to the ground by lowering the tractor 3-point hitch.

As is apparent from the drawings and Description of the Preferred Embodiment, the cam-shaped adjustment members 44 and their associated bracket connections 48 and 42 to the tail wheel tube 50 and mower housing 12 provide for a simple and easily adjusted tail wheel mechanism or blade height adjustment.

The lower bracket 42 being mounted on the deck 14 of the mower housing 12 and laterally adjacent to the rear terminal portion of the deck reinforcing member or beam 24 provides for reduced stress on the deck structure 14 caused by the forces imparted through the wheel 32 and tail wheel tube 50 and adjustment members 44 and to the deck 14. Accordingly, reduced twisting forces are imparted to the deck 14 and skirt sections 38 and 40 and improved durability is realized.

While what has been described is at present considered to be the preferred embodiment of the invention, it will be understood that the invention is not limited thereto and that various changes and modifications may be made therein without departing from the scope.

I claim:

1. Means for adjustably supporting a mower housing above the ground;
    said housing including a generally horizontal deck with at least one generally horizontal deck reinforcing member;
    means at the forward end of the housing connectable to a mobile vehicle, for supporting the front portion of said housing;
    ground engaging means for adjustably supporting the rear portion of the housing including:
    a tail wheel;
    a generally fore-and-aft extending tail wheel support tube carried above the deck and projecting beyond the rear portion of said deck, the front portion of the tube attached to the deck for swinging movement about a generally horizontal pivot;
    and means between the tube and deck for adjustably positioning the tube relative to the deck including:
    first and second bracket means mounted on the deck and tube respectively; and
    a cam-shaped adjustment member extending between the brackets:
    said member having a plurality of adjustments selectively connectable with the first and second brackets.

2. The invention described in claim 1 wherein the first bracket is carried on the deck laterally spaced from but substantially fore-and aft aligned with the rear terminal portion of the deck reinforcing member.

3. The invention described in claim 1 wherein the first bracket is carried on the deck, and includes a pair of ear structures projecting upwardly with aligned openings therethrough, the second bracket is comprised of a horizontal opening through the tail wheel tube, and a pair of cam-shaped members extend alongside the ear structures and also alongside the opposite sides of the tube with the cam members being adjustably connectable to the tube and ear structures by bolts.

4. The invention described in claim 1 wherein the major portion of the cam-shaped member is carried beneath the upper surface of the tail wheel tube for substantially all its selective adjustments.

* * * * *